(12) United States Patent
Bukosky et al.

(10) Patent No.: US 6,749,325 B2
(45) Date of Patent: Jun. 15, 2004

(54) SIGNALING ASSEMBLY

(75) Inventors: Allen A. Bukosky, Sheboygan, WI (US); Daniel J. Mathieu, Sheboygan Falls, WI (US); Daniel R. Todd, Sheboygan, WI (US)

(73) Assignee: K.W. Muth Company, Sheboygan, WI (US)

( * ) Notice: Subject to any disclaimer, the term of this patent is extended or adjusted under 35 U.S.C. 154(b) by 21 days.

(21) Appl. No.: 10/283,715

(22) Filed: Oct. 29, 2002

(65) Prior Publication Data

US 2004/0080958 A1 Apr. 29, 2004

(51) Int. Cl.⁷ .................................................. B60Q 1/26
(52) U.S. Cl. ........................ 362/494; 362/544; 362/135; 362/540
(58) Field of Search .................. 362/494, 544, 362/545, 135, 540, 800, 235, 249

(56) References Cited

U.S. PATENT DOCUMENTS

| | | | |
|---|---|---|---|
| 2,595,331 A | 5/1952 | Calihan et al. | |
| 3,266,016 A | 8/1966 | Maruyama et al. | |
| 4,821,019 A | * 4/1989 | Taylor | ......................... 362/494 |
| 4,882,565 A | * 11/1989 | Gallmeyer | .................. 340/461 |
| 5,014,167 A | 5/1991 | Roberts | |
| 5,059,015 A | 10/1991 | Tran | |
| 5,207,492 A | 5/1993 | Roberts | |
| 5,355,284 A | 10/1994 | Roberts | |
| 5,361,190 A | 11/1994 | Roberts et al. | |
| 5,371,659 A | 12/1994 | Pastrick et al. | |
| 5,402,103 A | 3/1995 | Tashiro | |
| 5,436,741 A | 7/1995 | Crandall | |
| 5,481,409 A | 1/1996 | Roberts | |
| 5,497,305 A | 3/1996 | Pastrick et al. | |
| 5,499,169 A | 3/1996 | Chen | |
| 5,634,709 A | * 6/1997 | Iwama | ......................... 362/492 |
| 5,788,357 A | 8/1998 | Muth et al. | |
| 5,892,438 A | * 4/1999 | Vaughn | ....................... 340/468 |
| 6,005,724 A | 12/1999 | Todd | |
| 6,045,243 A | 4/2000 | Muth et al. | |
| 6,076,948 A | 6/2000 | Bukosky et al. | |
| 6,142,656 A | * 11/2000 | Kurth | .......................... 362/494 |
| 6,257,746 B1 | * 7/2001 | Todd et al. | ................... 362/494 |
| 6,264,353 B1 | * 7/2001 | Caraher et al. | .............. 362/494 |
| 6,276,821 B1 | * 8/2001 | Pastrick et al. | .............. 362/494 |
| 6,355,920 B1 | * 3/2002 | Schofield et al. | ............ 250/206 |

FOREIGN PATENT DOCUMENTS

| | | |
|---|---|---|
| GB | 268359 | 7/1927 |
| GB | 1172382 | 11/1969 |

* cited by examiner

Primary Examiner—Thomas M. Sember
(74) Attorney, Agent, or Firm—Wells St. John P.S.

(57) ABSTRACT

A signaling assembly is disclosed and which includes a reflective substrate having opposite first and second surfaces, and wherein the reflective substrate simultaneously reflects visibly discernible electromagnetic radiation, and passes visibly discernible electromagnetic radiation; a plurality of electromagnetic radiation emitters which are borne by the second surface and which, when energized, emit electromagnetic radiation; and a reflector is borne by the second surface and which directs the electromagnetic radiation emitted by some of the electromagnetic radiation emitters in a direction so that it may pass through the reflective substrate and be viewed from a location forward of the first surface, and the electromagnetic radiation emitted by a remainder of the electromagnetic radiation emitters in a direction so that it may be viewed from a location forward of the second surface.

40 Claims, 6 Drawing Sheets

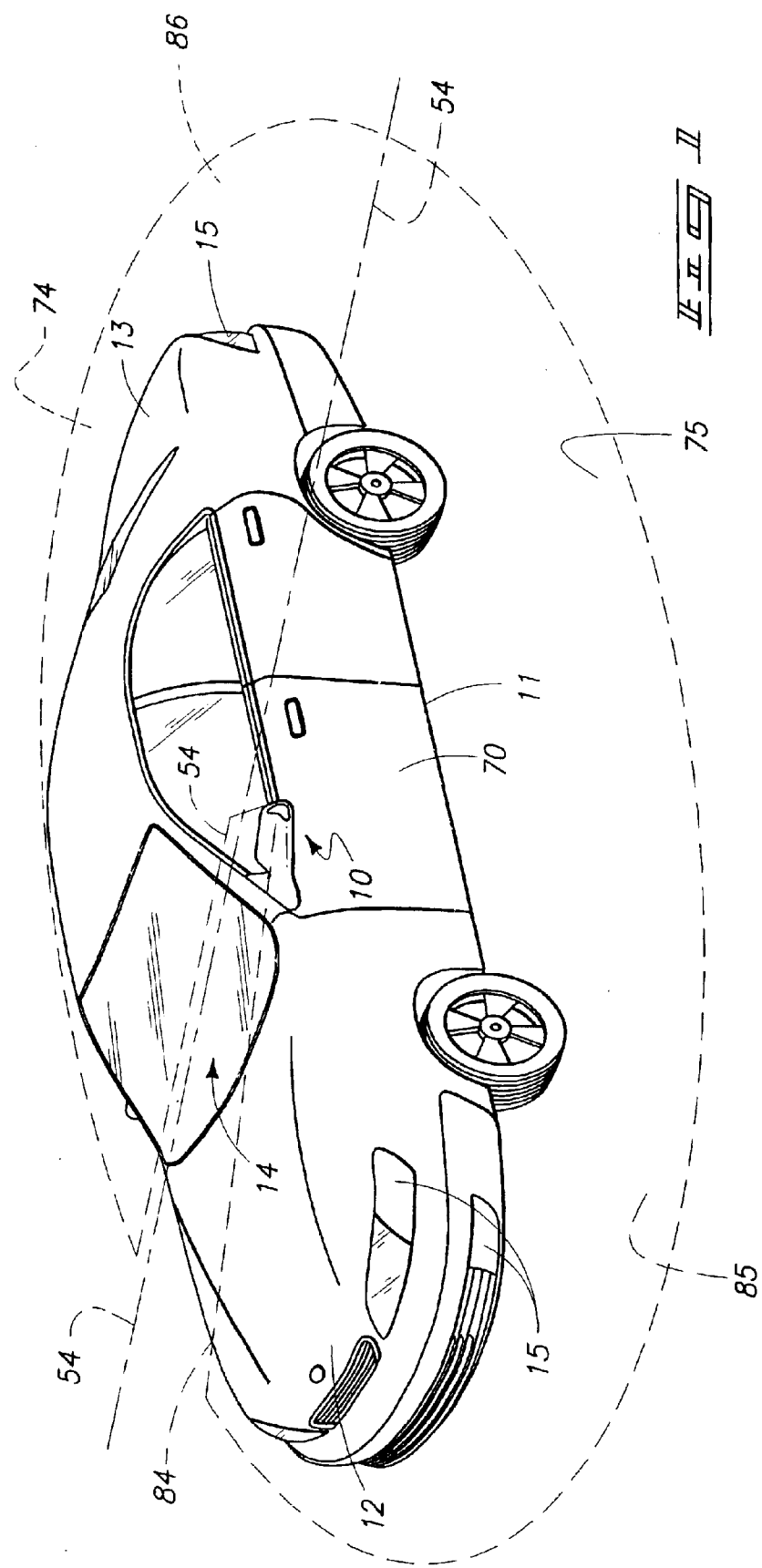

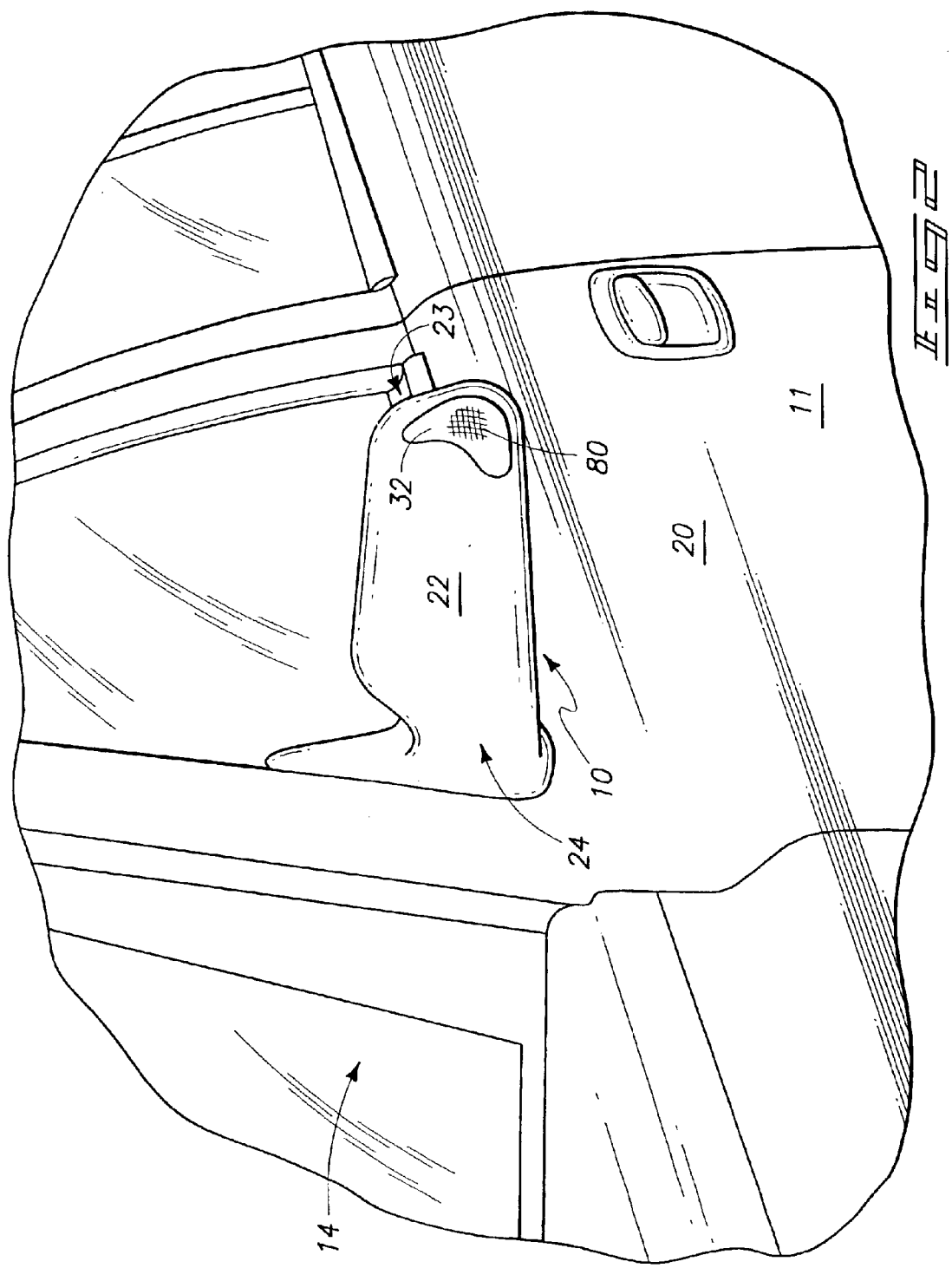

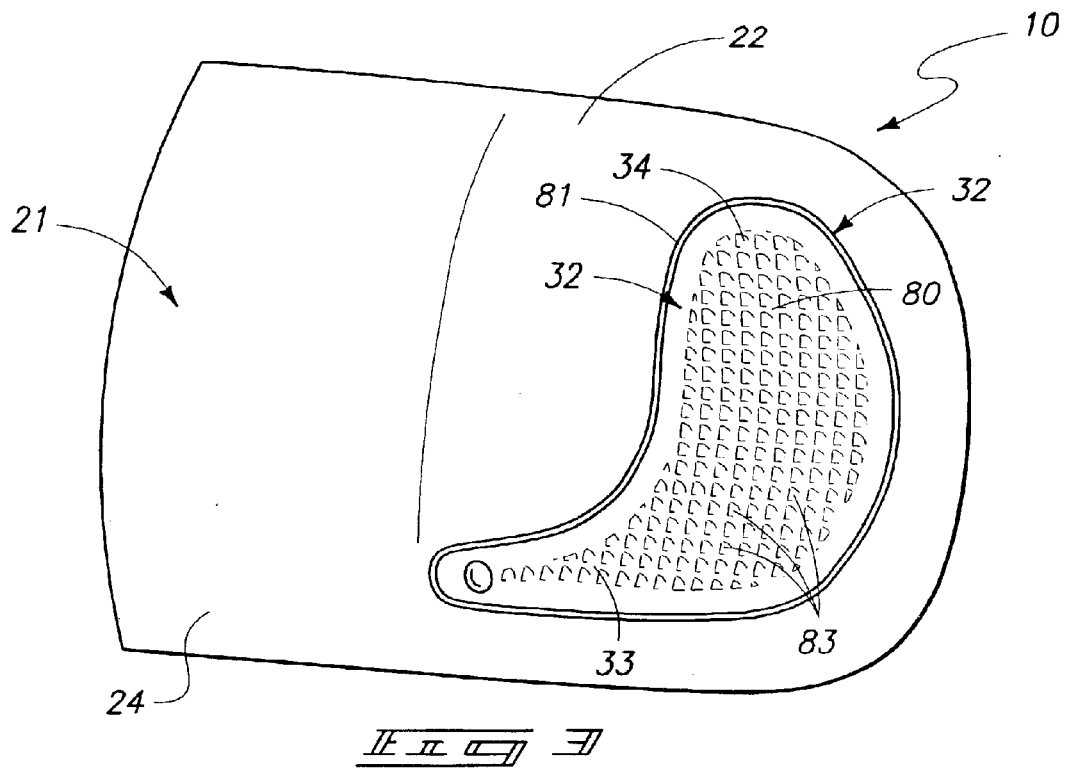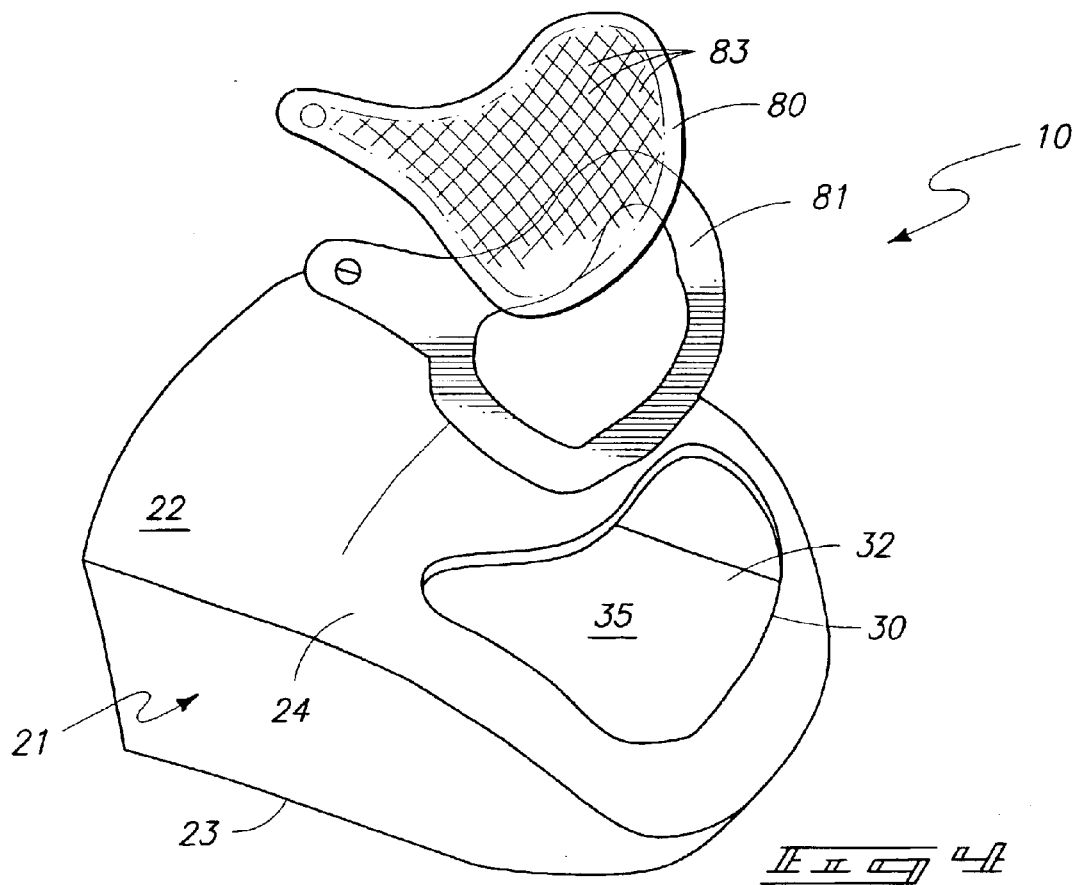

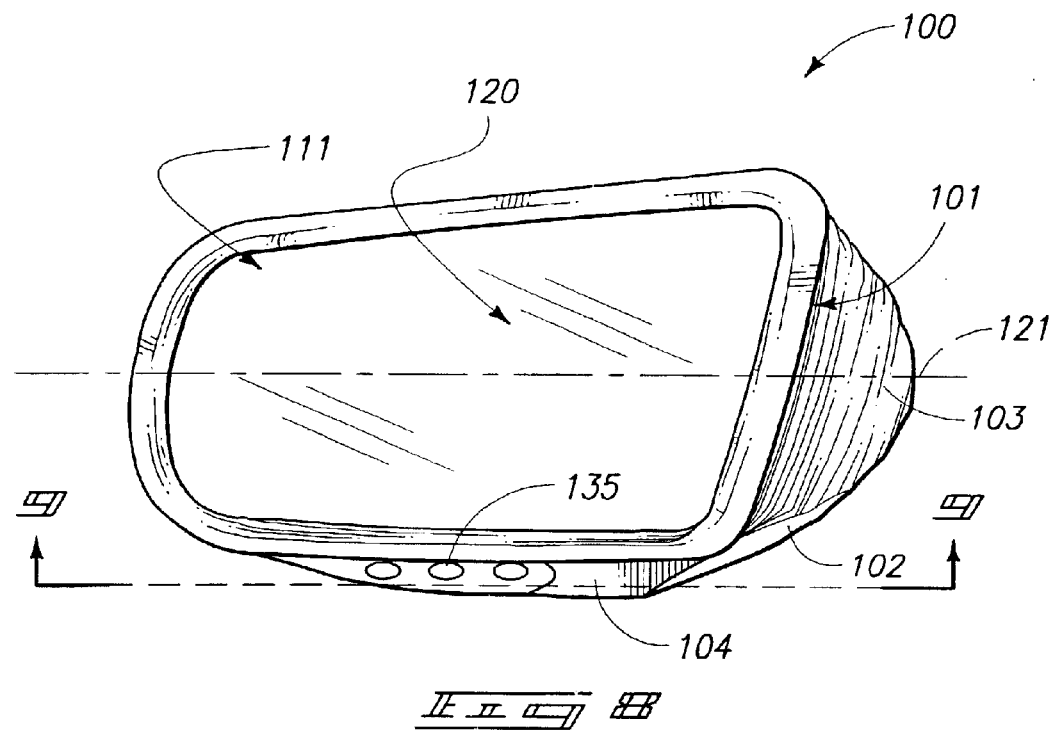
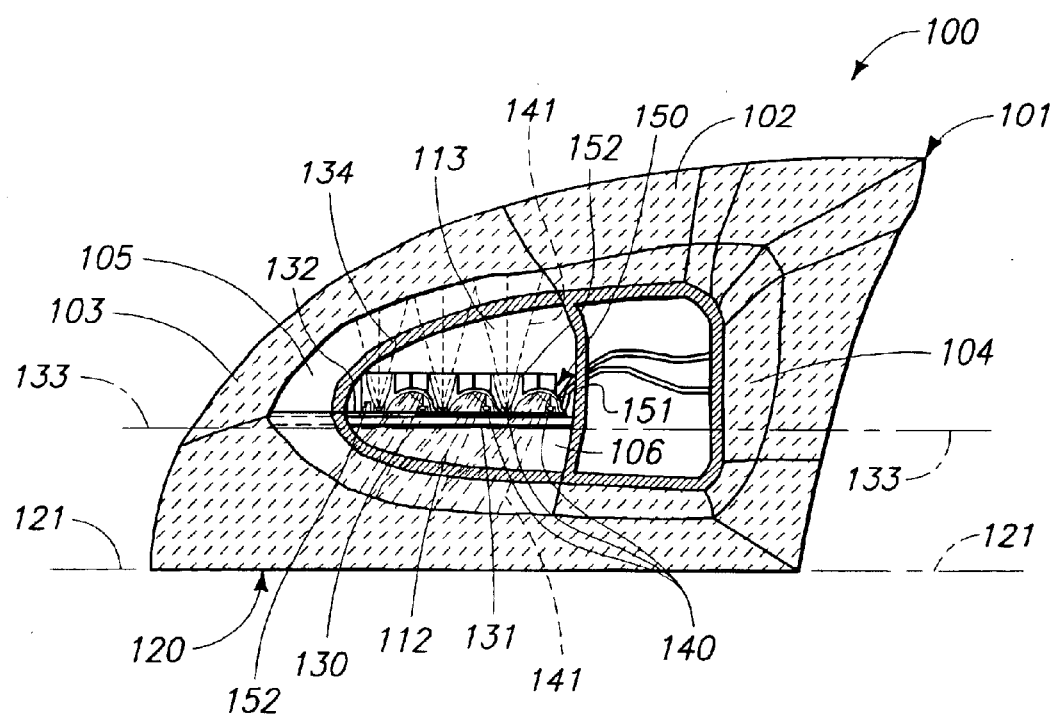

SIGNALING ASSEMBLY

TECHNICAL FIELD

The present invention relates to a signaling assembly which finds usefulness when installed on overland vehicles, and more particularly to a signaling assembly which when coupled with the controls of an overland vehicle may operate as a combined warning lamp and rear view mirror assembly, and which further provides a visibly discernible signal which can be viewed from a wide range of locations not possible heretofore.

BACKGROUND OF THE INVENTION

The beneficial effects of employing auxiliary signaling assemblies have been disclosed in various United States Patents including U.S. Pat. Nos. 5,014,167; 5,207,492; 5,355,284; 5,361,190; 5,481,409; 5,499,169; 5,528,422; 6,005,724; and 6,257,746 all of which are incorporated by reference herein. The mirror assemblies disclosed in some of these patents teach the use of various dichroic mirrors which are operable to reflect a broad band electromagnetic radiation, within the visible light portion of the spectrum, while simultaneously permitting electromagnetic radiation having wavelengths which reside within a predetermined spectral band to pass therethrough. As disclosed in this earlier prior art, these same dichroic mirrors remain an excellent visual image reflector, that is, achieving luminous reflectance which is acceptable for automotive, and other industrial applications, while simultaneously achieving an average transmittance in the predetermined spectral band which is suitable for use as a visual signal at a wide range of distances and for various purposes.

While all of these prior art devices have worked with some degree of success, various shortcomings have been uncovered which have detracted from their wide spread use. Among the several shortcomings which have impeded commercial introduction has been the manufacturing costs associated with applying the rather complex optical coatings which are necessary to form the dichroic mirrors that are employed in these devices.

Still further, other devices have been introduced which diverge, to some degree, from the use of dichroic mirrors. These devices however, when built in accordance with their teachings, have been unable to provide the same performance characteristics as provided by the prior art which employs dichroic mirrors. Still further, other prior art references have described devices which attempt to provide the same functional benefits as described in these earlier patents. These references describe all manner of mirror housing modifications, where for example, lamps are located in various orientations to project light into predetermined areas both internally and/or beside the overland vehicle and to further provide auxiliary signaling or warning capability. Examples of these patents include U.S. Pat. Nos. 4,583,155; 4,646,210; 4,916,430; 5,059,015; 5,303,130; 5,371,659; 5,402,103; 5,497,306; and 5,436,741 to name but a few.

In addition to the shortcomings associated with fabricating a suitable dichroic coating for use in mirror assemblies as described in the prior art, the associated mirror housings have decreased in volume as a result of recent automotive platform design changes. Consequently, the amount of internal space which is available when these same housings are employed is quite limited. Therefore, the size and weight of an enclosed light emitting assembly employed in such signaling devices has become a significant factor in the development and commercial introduction of a suitable product.

To address these and other perceived shortcomings in the prior art, U.S. Pat. No. 6,005,724 disclosed a novel mirror assembly which employed a mirror substrate which is fabricated by using conventional techniques, and which includes a primary mirror surface region which reflects less than about 80% of a given band of visibly discernable electromagnetic radiation; and a secondary region adjacent thereto and through which electromagnetic radiation may pass. In mirrors of this design, the average reflection of the mirror coating is greater than about 50%. This novel invention resulted in significant decreases in the manufacturing costs for devices of this type. Still further, the perceived safety advantages of using such auxiliary signaling devices has now been well established, inasmuch as these same signaling assemblies provide a convenient means whereby an operator may signal vehicles which are adjacent to, and rearwardly oriented relative to an overland vehicle equipped with same, of their intention, for example, to change lanes, turn, or perform other vehicle maneuvers which would be of interest to vehicles traveling adjacent thereto.

A signaling assembly which achieves these and other advantages is the subject matter of the present application.

SUMMARY OF THE INVENTION

Therefore one aspect of the present invention relates to a signaling assembly which includes a reflective substrate having opposite first and second surfaces, and wherein the reflective substrate simultaneously reflects visibly discernable electromagnetic radiation, and passes visibly discernable electromagnetic radiation; a plurality of electromagnetic radiation emitters which are borne by the second surface and which, when energized, emit electromagnetic radiation; and a reflector borne by the second surface and which directs the electromagnetic radiation emitted by some of the electromagnetic radiation emitters in a direction so that it may pass through the reflective substrate and be viewed from a location forward of the first surface, and the electromagnetic radiation emitted by a remainder of the electromagnetic radiation emitters in a direction so they may be viewed from a location forward of the second surface.

Another aspect of the present invention relates to a signaling assembly which includes, a reflective substrate having opposite first and second surfaces; a plurality of electromagnetic radiation emitters borne by the second surface and which emit electromagnetic radiation when energized; and a reflector having first and second portions each of which has an axis of orientation, and wherein the first and second portions are each disposed in reflecting relation relative to a portion of the electromagnetic radiation emitters, and wherein the respective axes of orientation extend in diverging substantially opposite relation one relative to the other, and wherein the first portion of the reflector directs emitted electromagnetic radiation in a direction so that it may pass through the reflective substrate and be viewed from locations forward of the first surface, and the second portion of the reflector directs emitted electromagnetic radiation in a direction so that it may be viewed from a location forward of the second surface.

Still another aspect of the present invention relates to a signaling assembly which includes a housing mounted on an overland vehicle and which has a substantially opaque sidewall, and which defines an internal cavity, and first and second apertures, and wherein the housing has first and second sides; a reflective substrate positioned in substantially occluding relation relative to the first aperture, and further having opposite first and second surfaces, and wherein the second surface of the reflective substrate faces in the direction of the cavity, and the first surface faces away from the cavity, and wherein the reflective substrate is operable to both reflect and pass visibly discernable electromagnetic radiation; a translucent substrate disposed in substantially occluding relation relative to the second aperture; a plurality of electromagnetic radiation emitters mounted on the second surface of the reflective substrate, and which each face in the direction of the cavity, and which, when energized, emit visibly discernable electromagnetic radiation; and a reflector positioned in reflecting relation relative to the plurality of electromagnetic radiation emitters, and wherein the reflector has a first portion which reflects electromagnetic radiation emitted by at least one of the electromagnetic radiation emitters in a direction where it is subsequently passed by the reflective substrate and can be seen from one side of the housing, and a second portion which reflects electromagnetic radiation emitted by at least one of the electromagnetic radiation emitters through the translucent substrate which substantially occludes the second aperture, and wherein the electromagnetic radiation which passes through the translucent substrate can be viewed from the opposite side of the housing.

Yet still a further aspect of the present invention relates to a signaling assembly for use on an overland vehicle and which includes a housing having a sidewall, and which defines first and second internal cavities and first, second and third apertures; a reflective substrate supported by the housing and disposed in substantially occluding relation relative to the first aperture; and wherein the reflective substrate defines a first line of reference; a first light transmissible substrate supported by the housing and disposed in substantially occluding relation relative to the second aperture, and wherein the light transmissible substrate has a forward facing surface which defines a second line of reference, and a rearward facing surface which faces in the direction of the second internal cavity, and wherein the second line of reference is oriented in spaced, relation relative to the first line of reference, and wherein the third aperture communicates with the second internal cavity, and a translucent substrate is disposed in substantially occluding relation relative to the third aperture; a plurality of electromagnetic radiation emitters mounted on the rearwardly facing surface of the light transmissible substrate and which, when energized, emit electromagnetic radiation which passes through the light transmissible substrate and the translucent substrate; and a reflector mounted on the rearwardly facing surface of the light transmissible substrate, and wherein the reflector has a first portion which is oriented in reflecting relation relative to some of the electromagnetic radiation emitters, and a second portion which is oriented in reflecting relation relative to the remainder of the electromagnetic radiation emitters.

These and other aspects of the present invention will be discussed in greater detail hereinafter.

BRIEF DESCRIPTION OF THE DRAWINGS

Preferred embodiments of the invention are described below with reference to the following accompanying drawings.

FIG. 1 is a perspective view of an overland vehicle which employs the signaling assembly of the present invention.

FIG. 2 is a perspective, somewhat enlarged view of the signaling assembly of the present invention and which is appropriately mounted on an overland vehicle.

FIG. 3 is a perspective side elevation view of one side of the signaling assembly of the present invention.

FIG. 4 is a partial, perspective, exploded view of the housing employed with the signaling assembly of the present invention.

FIG. 8 is a fragmentary, side elevation view of a second form of the signaling assembly of the present invention.

FIG. 9 is a fragmentary, transverse, vertical sectional view of the second form of the signaling assembly of the present invention and which is taken from a position along line 9—9 of FIG. 8.

DETAILED DESCRIPTION OF THE PREFERRED EMBODIMENTS

This disclosure of the invention is submitted in furtherance of the constitutional purposes of the U.S. Patent Laws "to promote the progress of science and useful arts" (Article 1, Section 8).

First Form

Figure 5:
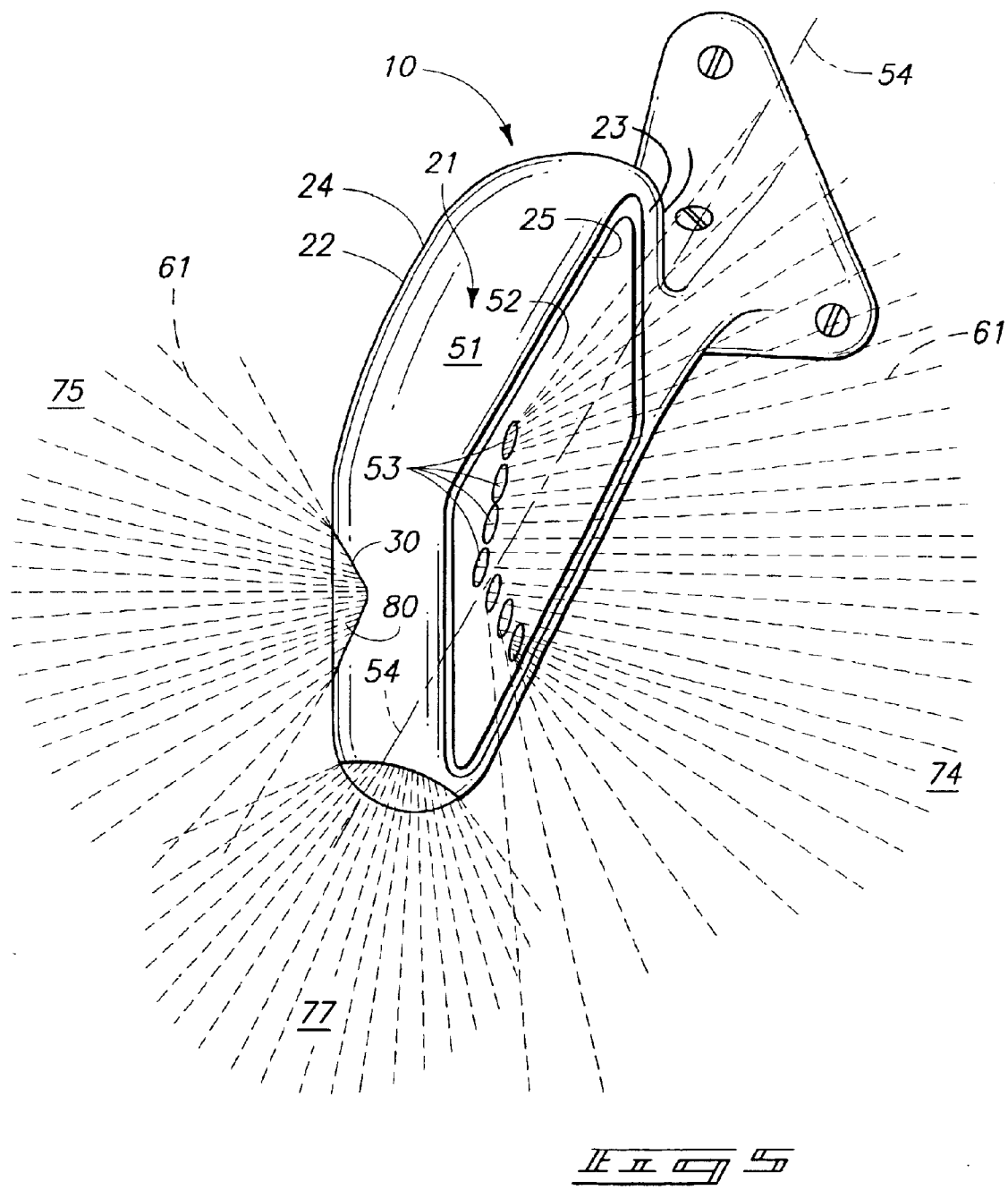
FIG. 5 is a perspective view of an energized signaling assembly of the present invention.
Figure 6:
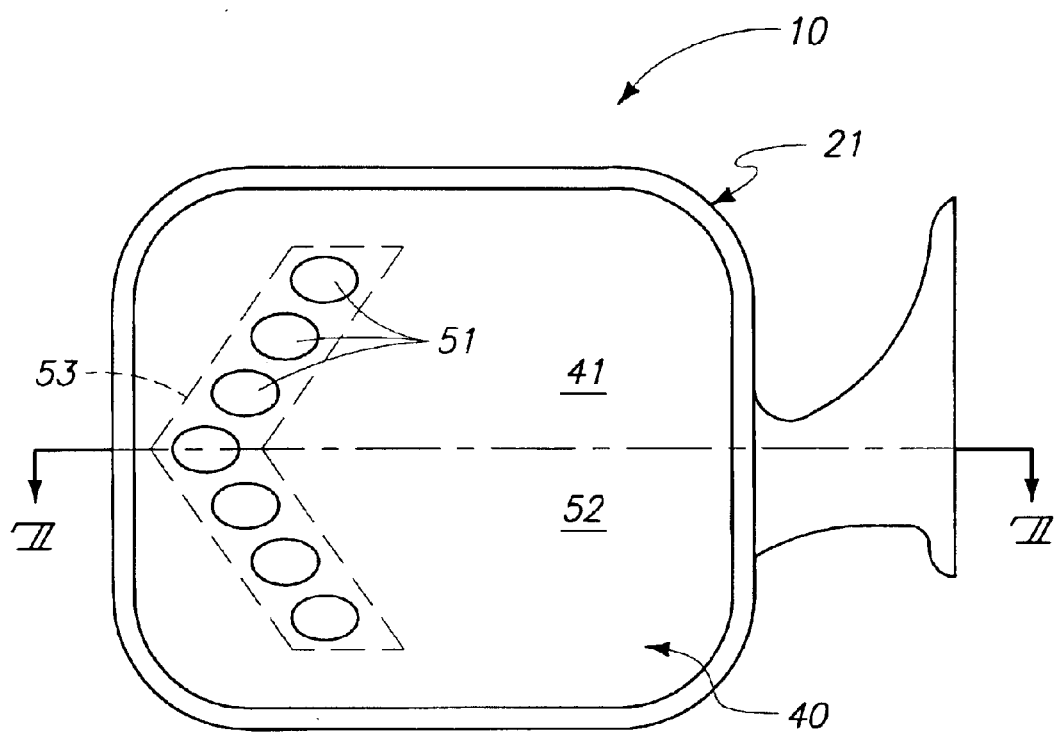
FIG. 6 is a second, side elevation view and which illustrates one side of a signaling assembly of the present invention.
Figure 7:
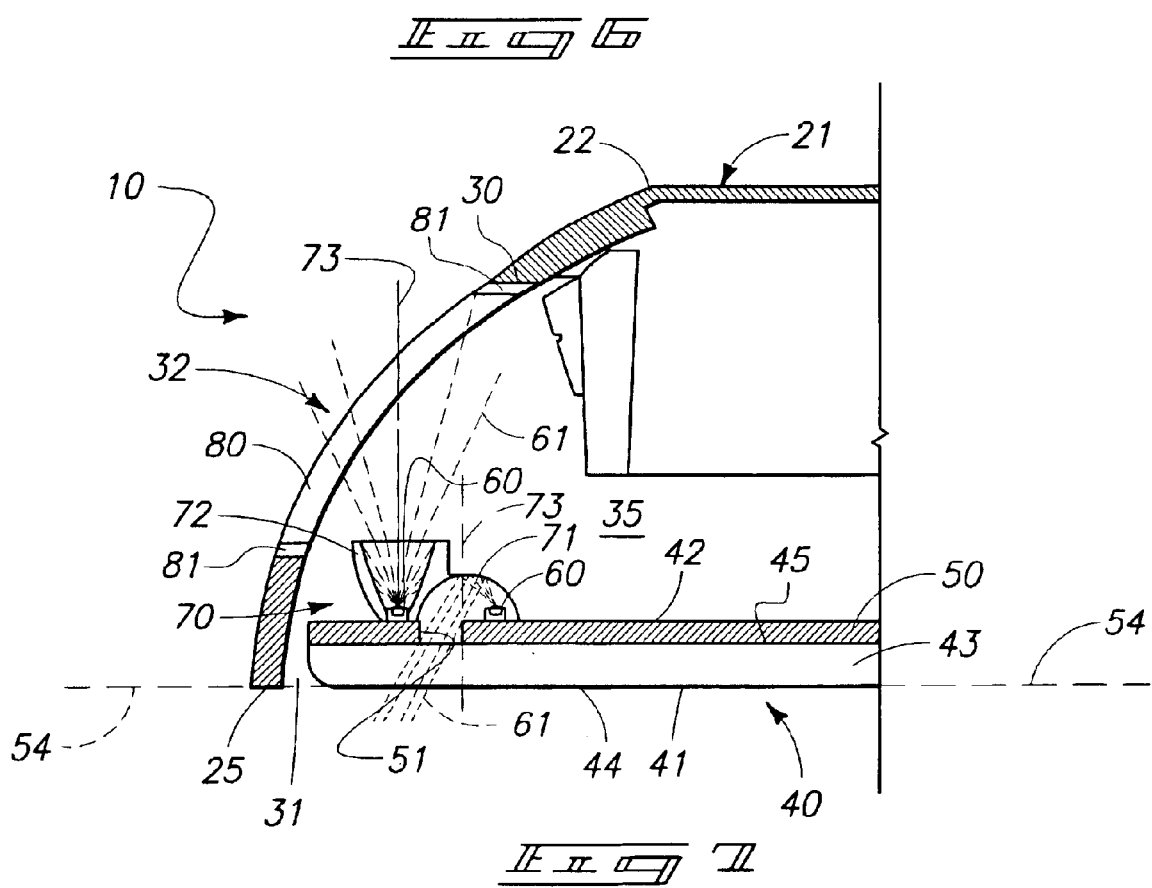
FIG. 7 is a fragmentary, transverse, vertical sectional view of a signaling assembly of the present invention, and which is taken from a position along line 7—7 of FIG. 6.

A first form of a signaling assembly which incorporates the teachings of the present invention is best seen by reference to the numeral 10 in FIGS. 1–7 respectively. As discussed above, the present invention finds usefulness when installed on an overland vehicle 11 of conventional design and which is best seen by reference to FIG. 1. As shown therein, the overland vehicle 11 has a forward, or front end 12; an opposite, or rear end 13; and an operator's position 14. From the operator's position 14, various signaling lamps indicated by the numeral 15 can be selectively energized in order to provide visual information to adjoining drivers regarding the intended directional movement of the overland vehicle 11 as it proceeds along a given course of travel. As seen more specifically by reference to FIG. 2, the apparatus 10 is mounted on or near the door 20 of the overland vehicle such that a portion, or one side of same (FIG. 6) can be viewed from the operators position 14 and from positions laterally and rearwardly of the overland vehicle 11. As seen more specifically in FIGS. 3 through 7, the apparatus 10 includes a housing generally indicated by the numeral 21. The housing 21 is formed of an opaque, convexly curved sidewall 22 although other shapes of the sidewall can work with equal success. The convexly curved sidewall has a first side 23, and an opposite, second side designated by the numeral 24. As seen in FIG. 5, for example, the sidewall 22 is defined by a first peripheral edge 25 which is located on the first side 23 of the housing. Further, the convexly curved sidewall 22 has a second peripheral edge 30 (FIG. 4), which is located on the second side 24 of the housing 23. As illustrated, the first peripheral edge 25 is located in generally about the same plane, and defines a first aperture 31 (FIG. 7). Yet further, the second peripheral edge 30, defines a second aperture 32 which follows the curvature or shape of the sidewall 22. This aspect of the invention can be seen by references to FIGS. 4 and 5, for example. The second aperture 32 has first and second diverging portions 33 and 34 (FIG. 3). The housing 21 defines a cavity 35 (FIGS. 4 and 7) and which encloses various assemblies which will be discussed in greater detail hereinafter.

As best seen by reference to FIG. 7, a reflective substrate or mirror 40 of substantially conventional design is received or otherwise supported in substantially occluding relation relative to the first aperture 31 which is defined by the housing 21. The reflective substrate or mirror 40 has a first or outwardly facing surface 41 which faces away from the cavity 35, and a second or inwardly facing surface 42 which faces inwardly toward the cavity 35. As best understood by the greatly simplified and exaggerated view of FIG. 7, the reflective substrate or mirror 40 is fabricated from a light transmissible substrate 43 which has opposite first and second surfaces 44 and 45, respectively.

A reflective layer which is generally indicated by the numeral 50, is positioned in at least partial covering relation relative to one of the first or second surfaces 44 or 45 of the light transmissible substrate. As should be understood, the location of the reflective layer on either one of these two surfaces will not meaningfully effect the operation of the present invention. As seen in FIG. 7, the reflective coating or layer 50 is positioned on the second or inwardly facing surface 45. The reflective layer 50 provides a highly reflective surface which reflects ambient, visibly discernable electromagnetic radiation. The reflective layer 50 may comprise a layer of chromium which is deposited to a thickness which passes less than about 6% of ambient visible electromagnetic radiation. As seen in the drawings, a discrete aperture 51 may be formed in the layer of chromium and which permits the passage of electromagnetic radiation therethrough. The aperture 51 may be formed in various sizes and shapes in order to achieve the benefits as will be described hereinafter. Still further, the reflective layer 50 may comprise a dichroic coating which is operable to pass a predetermined band of electromagnetic radiation. The dichroic coating may similarly be applied to one of the first or second surfaces 44 or 45. Assuming that a dichroic coating is utilized as the reflective layer 50, the requirement of forming or defining an aperture 51 is normally not necessary in view of the optical characteristics of the dichroic coating.

In an alternative embodiment, the reflective layer 50 which comprises chromium may be deposited to a given reduced thickness which permits the passage of increasing amounts of electromagnetic radiation therethrough. Such a reflective layer is typically referred to as "thin chrome." One skilled in the art is readily capable of calculating the thickness of the chromium which must be deposited in order to form a reflective layer 50 which passes the desired amounts of visibly discernable electromagnetic radiation. In yet still a further embodiment, the reflective layer 50 may be deposited on the light transmissible substrate in a manner to form two portions, that is a first portion comprising chromium which is deposited to a thickness which passes less than about 6% of ambient visible electromagnetic radiation, and a second portion having a thickness less than the first portion, and which passes electromagnetic radiation in an amount greater than about 6%. In this arrangement, the blemish, which would normally result in the mirror 40 and which is caused by the formation of the aperture 51 in the reflective layer 50 is substantially avoided, because the first surface 41 of the reflective substrate 40 would appear to a casual observer as being substantially continuous.

Regardless of the form of the reflective substrate 40 which is chosen to occlude the first aperture 31 of the housing 21, the reflective substrate is operable to simultaneously reflect visibly discernable electromagnetic radiation and pass visibly discernable electromagnetic radiation for the purposes which are described below.

As seen in FIG. 6, for example, the reflective substrate has a primary or first region 52 which reflects on average at least about 35% of all visibly discernable electromagnetic radiation; and passes less than about 6% of all visibly discernable electromagnetic radiation, and a second region 53 (shown in dashed lines in FIG. 6), and which passes greater than about 6% of the same visibly discernable electromagnetic radiation. As illustrated in the drawings, the secondary region 53 which is adjacent to the primary region 52 includes a plurality of light emitting apertures 51 that are disposed in a given pattern. The light emitting apertures 51, as earlier discussed, are formed in the secondary region by removing the reflective coating or layer 50 in a given pattern. As seen in the drawings, and as discussed above, the secondary region may be continuous or discontinuous. The specific details of forming the primary and secondary regions 53 and 54 are set forth in greater detail in U.S. Pat. No. 6,005,724 the teachings of which are incorporated by reference herein. As seen in FIGS. 5 and 7, the first or forwardly facing surface 41 of the reflective substrate or mirror 40 defines a line of reference which is generally indicated by the numeral 54.

As seen most clearly by reference to FIG. 7, a plurality of electromagnetic radiation emitters, here illustrated as a plurality of LEDs 60 are borne by the second surface 42 of the reflective substrate 40 and which, when energized emit electromagnetic radiation which is indicated by the numeral 61. As should be appreciated, while the electromagnetic radiation emitters 60 (LEDs) are shown, in the present form of the invention, mounted on the reflective layer 50, in the event that the reflective substrate or mirror 40 which is mounted on the housing 21 has a reflective layer positioned on the first surface 41, then under those circumstances, the electromagnetic radiation emitters 60 would be mounted on the second or inwardly facing surface 45 of the light transmissible substrate 43. As seen in FIG. 7, the plurality of electromagnetic radiation emitters 60 are each mounted in approximately the same orientation relative to the second surface 42 of the reflective substrate 40. It will be understood, however, that while FIG. 7 shows the respective electromagnetic radiation emitters (LEDs) positioned in approximately the same orientation, it is possible to mount the respective electromagnetic radiation emitters 60 in different orientations relative to the second surface 42 to achieve other assorted benefits. The plurality of electromagnetic radiation emitters 60 may be affixed to the second surface 42 of the reflective substrate 40 by means of adhesives and other fastening techniques. Still further, the respective electromagnetic radiation emitters may be electrically coupled to the controls of the overland vehicle 11 by way of discrete electrical wires which may be formed into a pig-tail; or further, may be electrically coupled to the controls by way of electrical tracings which are made integral with the reflective substrate 40. Such electrical tracings may be applied by various silk screening techniques and the like. Still further, it is possible that these same electromagnetic radiation emitters may be coupled to the controls of the overland vehicle by way of electrical conductors incorporated into another structure, such as a heater which is made integral with the reflective substrate 40. Still further, the respective electromagnetic radiation emitters 60 may be mounted on a separate circuit board (not shown) and which may be immediately juxtaposed relative to the second surface 42. This circuit board may be of a rigid design, or one that is fabricated of a more flexible substrate. In this arrangement, the circuit board (not shown) would have discrete apertures formed therein (if the circuit board was substantially opaque) and which would be substantially coaxially aligned relative to the respective apertures 51 which are formed in the reflective layer 50. In any event, and regardless of the nature of how the respective electromagnetic radiation emitters 60 are mounted, the respective electromagnetic radiation emitters 60 each face away from the second surface 42 and in the direction of the cavity 35. This is most clearly seen in FIG. 7. The plurality of electromagnetic radiation emitters may emit visibly discernable electromagnetic radiation 61 having approximately the same wavelength and thus color, or further, may have different colors when energized depending upon the needs of the end user.

As seen in FIG. 7, the signaling assembly 10 of the present invention includes a reflector 70 which is borne by the second surface 42 of the reflective substrate 40 and which directs the electromagnetic radiation 61 emitted by some of the electromagnetic radiation emitters in a direction so that it may pass through the reflective substrate 40 and be viewed from a location forward of the first surface 41, and the electromagnetic radiation 61 emitted by the remainder of the electromagnetic radiation emitters 60 in a direction so that they may be viewed from a location forward of the second surface 42. In this regard, the reflector 70 has a first portion 71 which is disposed in substantially reflecting relation relative to some of the electromagnetic radiation emitters 60 and the aperture 51. As seen in FIG. 7, the first portion 71 of the reflector 70 directs the electromagnetic radiation 61 emitted by some of the electromagnetic radiation emitters 60 through the aperture 51 so that it may be viewed from a location forward of the first surface 41. This is seen most clearly by reference to FIG. 5. As seen in FIG. 7, the electromagnetic radiation emitters 60 are positioned in laterally offset relation relative to the aperture 51. Still further, the individual first and second portions of the reflectors 70 have individual axes of orientation generally indicated by the line labeled 73. As will be appreciated from a study of the drawing, the first portion 71 of the reflector 70 is oriented or otherwise positioned in eccentric reflecting relation relative to at least one of the plurality of electromagnetic radiation emitters 60. As such, the first portion 71 of the reflector is operable to direct emitted electromagnetic radiation 61 provided by some of the electromagnetic radiation emitters 60 through the aperture 51 such that it may be seen from a first position 74 which is located in front or forward of the first surface 41 of the reflective substrate 40. When the invention 10 is mounted on an overland vehicle, the emitted electromagnetic radiation 61 can be seen from a location laterally and to the rear thereof.

As illustrated in FIG. 7, the second portion 72 of the reflector 70 is operable to direct emitted electromagnetic radiation 61 originating from some of the electromagnetic radiation emitters 60 in a direction such that it may be viewed from a second position 75 which is forward of and laterally disposed relative to the second surface 42 of the reflective substrate 40 (FIGS. 1, 5 and 7). As will be appreciated, the emitted electromagnetic radiation 61 which is directed forward of the second surface 42 is directed by way of the second portion 72 of the reflector 70 through the aperture 32 which is defined by the sidewall 22 of the housing 21. As seen in FIG. 7, the first and second portions 71 and 72 are made integral with one another to form a substantially unitary reflecting body. However, it is possible that the first and second portions may be positioned in predetermined spaced relation one to the other. The respective portions of the reflector 70 may be fabricated in various shapes in order to provide a reflection of the electromagnetic radiation 61 in the desired direction for the particular automotive platform application on which the signaling assembly 10 is mounted. As seen in FIG. 7, the lines of orientation 73 of the first and second portions 71 and 72 are disposed in substantially parallel spaced relation one to the other. It is possible however to fabricate a reflector 70 where the respective axes of orientation 73 are oriented in nonparallel relation. In any event, the reflector 70 is operable to reflect the emitted electromagnetic radiation 61 such that a portion of the emitted electromagnetic radiation is transmitted in a first direction, and another portion of the emitted electromagnetic radiation is transmitted in a diverging opposite or different second direction (FIG. 5).

As best seen by reference to FIG. 4, a translucent substrate 80 is provided and which is operable to substantially occlude the second aperture 32 which is defined by the sidewall 22 of the housing 21. As also seen in FIG. 4, a gasket 81 is provided and which prevents rain, snow, dust, etc. from entering the cavity 35. In some forms of the invention, this gasket may be eliminated. As will be recognized from a study of the drawings, the translucent substrate 80 permits electromagnetic radiation 61 and more specifically that electromagnetic radiation emitted by a portion of the electromagnetic radiation emitters 60 and which is reflected or directed by the second portion 72 of the reflector 70 to pass therethrough and be viewed from the second position 75 which is forward of the second surface 42. The translucent substrate 80 is fabricated by utilizing conventional manufacturing techniques. As seen in the drawings (FIGS. 3 and 4), the translucent substrate 80 may include a plurality of lenses 83 which are made integral with the translucent substrate and which provide a means for effectively dispersing or directing the visibly discernable electromagnetic radiation 61 in a wide pattern. As will be seen by reference to FIG. 1, sidewall 22 of the mirror housing 20 and which defines the second aperture 32, defines a second line of reference 84. Relative to this line of reference 84, the electromagnetic radiation 61 which is directed outwardly by way of the second portion 72 of the reflector 70 can be seen or otherwise forms a first zone of light 85 which can be viewed from a location laterally and forwardly of the overland vehicle 11. As seen in FIG. 1, relative to the line of reference 54, the electromagnetic radiation 61 which is reflected or otherwise directed by the first portion of the reflector 70 forms a second zone of light 86 which can be viewed from a location laterally and rearwardly of the vehicle 11 such as from the first position 74. This second zone of light 86 lies within, and less than about 180° relative to the line of reference 54. Still further, the first zone of light 85 which is transmitted and passes through the translucent substrate 80 may be substantially visibly discerned from locations laterally and forwardly disposed relative to the overland vehicle 11 and greater than about 180° relative to the line of reference 54. These respective zones of light 85 and 86 form discrete visibly discernable signals. As can be seen by reference to the drawings, the electromagnetic radiation 61 provided by the apparatus 10 is therefore substantially visible from assorted positions which are located at less than about 300° relative to the line of reference 54. As will be recognized, these first and second visibly discernable signals or respective zones of light 85 and 86 are normally illuminated substantially simultaneously although it is possible based upon the design of the signaling assembly that the first and second signals may be illuminated in an alternative manner, or in any given sequence which is desired.

Therefore with respect to the first form of the invention 10 as seen in FIGS. 1–7, the signaling assembly 10 includes a reflective substrate 40 having opposite first and second surfaces 41 and 42, and wherein the reflective substrate simultaneously reflects visibly discernable electromagnetic radiation and passes visibly discernable electromagnetic radiation; a plurality of electromagnetic radiation emitters 60 are provided and which are borne by the second surface 42 and which, when energized, emit electromagnetic radiation 61; and a reflector 70 is borne by the second surface and which directs the electromagnetic radiation 61 emitted by some of the electromagnetic radiation emitters in a direction so that it may pass through the reflective substrate 40 and be viewed from a location 74 which is forward of the first surface 41, and the electromagnetic radiation emitted by a remainder of the electromagnetic radiation emitters 60 in a direction so that it may be viewed from a second position 75 which is forward of the second surface 42.

More specifically, the first form of the invention relates to a signaling assembly 10 which has a reflective substrate 40 having opposite first and second surfaces 41 and 42. The signaling assembly 10 includes a plurality of electromagnetic radiation emitters 60 which are borne by the second surface 42, and which emit electromagnetic radiation 61, when energized. Still further a reflector 70 is provided and which has first and second portions 71 and 72. Each portion has an axis of orientation 43. The first and second portions 71 and 72 are each disposed in reflecting relation relative to a portion of the electromagnetic radiation emitters 60. The respective axes of orientation 73 extend in diverging, opposite or different directions, one relative to the other. The first portion 71 of the reflector 70 directs emitted electromagnetic radiation 61 in a direction so that it may pass through the reflective substrate 40 and be viewed from locations 74 forward of the first surface 41, and the second portion 72 of the reflector 70 directs emitted electromagnetic radiation in a direction so that it may be viewed from a location 75 and which is forward of the second surface 42.

The signaling assembly 10, in the first form of the invention as seen most specifically by reference to FIG. 7, includes a housing 20 mounted on an overland vehicle 11, and which has a substantially opaque sidewall 22, and which defines an internal cavity 35. The sidewall further defines first and second apertures 31 and 32. The housing has opposite first and second sides 23 and 24, respectively. A reflective substrate 40 having opposite first and second surfaces 41 and 42, respectively is disposed in substantially occluding relation relative to the first aperture. As seen in the drawings, the second surface 42 of the reflective substrate 40 faces in the direction of the cavity 35. Still further, the first surface 41 of the reflective substrate 40 faces away from cavity. The reflective substrate 40 is operable to both reflect and pass visibly discernible electromagnetic radiation. A translucent substrate 80 is provided and which is disposed in substantially occluding relation relative to the second aperture 32. A plurality of electromagnetic radiation emitters 60 are provided and which are mounted on the second surface 42 of the reflective substrate 40 and which each face in the direction of the cavity 35. The electromagnetic radiation emitters, when energized, emit visibly discernible electromagnetic radiation 61. A reflector 70 is positioned in reflecting relation relative to the plurality of electromagnetic radiation emitters 60. The reflector 70 has a first portion 71 which reflects electromagnetic radiation emitted by at least one the electromagnetic radiation emitters in a direction where it is subsequently passed by the reflective substrate and can be seen from one side 23 of the housing; and a second portion 72 which reflects the electromagnetic radiation 61 emitted by at least one of the electromagnetic radiation emitters through the translucent substrate 80 and which substantially occludes the second aperture 32. The electromagnetic radiation 61 which passes through the translucent substrate can be viewed from the opposite side 24 of the housing 21. As discussed above, the first portion of the reflector 71 forms a first signal and the second portion 72 of the reflector forms a second signal. The first and second signals are produced substantially simultaneously, although other energizing arrangements can be made such that the electromagnetic radiation emitters 60 may be illuminated at different times, intervals and sequences in order to provide signal combinations.

Second Form

The second form of the present invention is generally indicated by the numeral 100 and is best seen by reference to FIGS. 8 and 9, respectively. As seen therein, the invention 100 includes a housing 101 which is defined by a sidewall 102. The sidewall defines a first portion of the housing 103, and a second portion of the housing 104. As seen in FIG. 9, the sidewall 102 forming the first portion 103 of the housing defines a first cavity 105, and the sidewall 102 forming the second portion 104 of the housing 103 forms a second cavity 106. As seen by the drawings, the sidewall 102 forming the first and second portions of the housing 103 and 104 define first, second and third apertures 111, 112, and 113, respectively. As seen in FIGS. 8 and 9, the volume of the first cavity 105 is greater than that of the second cavity 106. Still further, the second portion 104 of the housing is positioned below and under the first portion 103 of the housing.

As seen in FIG. 8, a reflective substrate or mirror 120 is provided and which is supported by the first portion 103 of the housing 102. The mirror 120 substantially occludes the first aperture 111. The reflective substrate 120 is of substantially conventional design and is similar to that earlier discussed with respect to the first form of the invention. Therefore, further elaboration regarding the reflective substrate 120 is not necessary nor warranted under the present circumstances. The reflective substrate 120 defines a first line of reference which is generally indicated by the numeral 121.

An opaque circuit board 130 is supported by the housing 101 and disposed in substantially occluding relation relative to the second aperture 112 (FIG. 9). The opaque circuit board has a first or forward facing surface 131 and an opposite or second surface 132. The first forwardly facing surface 131 defines a second line of reference 133 which is oriented in spaced relation relative to the first line of reference 121. As seen by reference to FIG. 9, the third aperture 113 communicates with the second internal cavity 106. As best understood by a study of FIG. 9, a translucent substrate 134 is disposed in substantially occluding relation relative to the third aperture 113 as defined by the second portion 104 of the housing 101. A plurality of apertures 135 are formed in the opaque circuit board as seen in FIG. 8.

A plurality of electromagnetic radiation emitters 140 are mounted on the second or rearwardly facing surface 132 of the opaque circuit board 130. Similar to that described by the first form of the invention 10, the electromagnetic radiation emitters 140 when energized, emit electromagnetic radiation 141 which passes through the aperture 135 formed in the opaque circuit board 130, and the translucent substrate 134.

As seen in FIG. 9, a reflector which is generally indicated by the numeral 150, and which has a first portion 151, and a second portion 152, is mounted on the rearwardly facing or second surface 132 of the opaque circuit board 130. The first portion 151 of the reflector is oriented in reflecting relation relative to some of the electromagnetic radiation emitters 140. Still further, the second portion 152 is oriented in reflecting relation relative to the remainder of the electromagnetic radiation emitters 140. In a fashion similar to that seen in the first form of the invention, the first portion 151 of the reflector 150 reflects emitted electromagnetic radiation 141 in a direction so that it may pass through the apertures 135 and may be viewed from a position forward of the forward facing or first surface 131 of the opaque circuit board 130 and further, the second portion of the reflector 152 reflects emitted electromagnetic radiation through the third aperture 113, and the translucent substrate 134 so that it may be viewed from a location forward of the rearwardly facing surface 132 of the opaque circuit board. In a fashion similar to the first form of the invention, the light 141 emitted from the apparatus 100 can be seen, when mounted on an overland vehicle 11, from a wide range of positions both forwardly, laterally, and rearwardly relative to the intended direction of travel of the overland vehicle 11. As should be understood an optical coating may be applied to the translucent substrate, and which impedes the passage of ambient electromagnetic radiation into the second cavity 106. Still further, the forwardly facing surface 131 of the opaque circuit board may be coated with a highly reflective, or other surface preparation.

Therefore, it will be seen that the signaling assemblies 10 and 100 of the present invention provides a convenient means by which the shortcomings of the prior art devices or assemblies can be readily rectified and which further provides a signaling assembly which achieves additional benefits by providing a visible signal which can be seen through a wide range of locations relative to the overland vehicle and which has not been possible heretofore.

In compliance with the statute, the invention has been described in language more or less specific as to structural and methodical features. It is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

The invention claimed is:

1. A signaling assembly comprising:
    a reflective substrate having opposite first and second surfaces, and wherein the reflective substrate simultaneously reflects visibly discernible electromagnetic radiation, and passes visibly discernible electromagnetic radiation;
    a plurality of electromagnetic radiation emitters which are borne by the second surface and which, when energized, emit electromagnetic radiation; and
    a reflector borne by the second surface and which directs the electromagnetic radiation emitted by some of the electromagnetic radiation emitters in a direction so that it may pass through the reflective substrate and be viewed from a location forward of the first surface, and the electromagnetic radiation emitted by a remainder of the electromagnetic radiation emitters in a direction so that it may be viewed from a location forward of the second surface.

2. A signaling assembly as claimed in claim 1, and further comprising:
    a housing defining an internal cavity, and further having an aperture, and wherein the emitters are received in the cavity, and wherein the reflective substrate substantially occludes the aperture, and the second surface of the reflective substrate faces in the direction of the cavity.

3. A signaling assembly as claimed in claim 1, and wherein the reflective substrate has a primary region which reflects on average at least about 35% of all visibly discernible electromagnetic radiation, and a secondary region which passes at least about 6% of the same visibly discernible electromagnetic radiation.

4. A signaling assembly as claimed in claim 1, and wherein the reflective substrate further comprises:
    a substantially light transmissible substrate having opposite forward and rearward facing surfaces; and
    a reflective layer positioned in covering relation relative to one of the first or second surfaces, and wherein the plurality of electromagnetic radiation emitters are borne on the rearward facing surface.

5. A signaling assembly as claimed in claim 4, and wherein the reflective layer is positioned in at least partial covering relation relative to the rearwardly facing surface of the substantially light transmissible substrate, and wherein the electromagnetic radiation emitters are mounted on the reflective layer.

6. A signaling assembly as claimed in claim 4, and wherein the electromagnetic radiation emitters are mounted on a circuit board, and wherein the circuit board is mounted in juxtaposed relation relative to the rearward facing surface.

7. A signaling assembly as claimed in claim 4, and further comprising:
    a housing having a sidewall and which defines a cavity, and wherein the sidewall further defines first and second apertures, and wherein the reflective substrate substantially occludes the first aperture, and wherein the second surface of the reflective substrate is received within the cavity; and
    a translucent substrate positioned in substantially occluding relation relative to the second aperture.

8. A signaling assembly as claimed in claim 4, and wherein the reflective layer is a layer of chromium which is deposited to a thickness which permits the passage of electromagnetic radiation therethrough.

9. A signaling assembly as claimed in claim 4, and wherein the reflective layer is a dichroic coating which is operable to pass a band of electromagnetic radiation, and wherein the electromagnetic radiation emitters emit electromagnetic radiation which lies within the band of electromagnetic radiation passed by the dichroic coating.

10. A signaling assembly as claimed in claim 4, and wherein the reflective layer is a layer of chromium which is deposited to a thickness which passes less than about 6% of ambient visible electromagnetic radiation, and wherein the reflective layer is discontinuous.

11. A signaling assembly as claimed in claim 4, and wherein the reflective layer is a layer of chromium which is deposited to a thickness which passes less than about 6% of ambient visible electromagnetic radiation, and wherein a discrete aperture is formed in the layer of chromium and which passes the electromagnetic radiation emitted by some of the electromagnetic radiation emitters, and wherein the electromagnetic radiation emitters are oriented in laterally offset relation relative to the discrete aperture.

12. A signaling assembly as claimed in claim 11, and wherein the reflector has a first portion which is disposed in reflecting relation relative to some of the electromagnetic radiation emitters and the aperture, and wherein the first portion of the reflector directs the electromagnetic radiation emitted by some of the electromagnetic radiation emitters through the aperture so that it may be viewed from a location forward of the first surface.

13. A signaling assembly as claimed in claim 12, and wherein the reflector has a second portion which is disposed in reflecting relation relative to the remaining electromagnetic radiation emitters, and wherein the second portion of the reflector directs the electromagnetic radiation emitted by the remaining electromagnetic radiation emitters in the direction so that it may be viewed from the location forward of the second surface.

14. A signaling assembly as claimed in claim 13, and wherein the electromagnetic radiation emitted by the remaining electromagnetic radiation emitters passes through the translucent substrate which is positioned in substantially occluding relation relative to the second aperture which is defined by the housing.

15. A signaling assembly as claimed in claim 13, and wherein the first and second portions of the reflector are disposed in spaced relation one to the other.

16. A signaling assembly as claimed in claim 13, and wherein the first and second portions of the reflector are made integral one with the other.

17. A signaling assembly as claimed in claim 1, and wherein the reflective substrate defines a line of reference, and wherein the emitted electromagnetic radiation which can be viewed from a position forward of the first surface is viewed from a location which is less than 180 degrees relative to the line of reference, and wherein the location forward of the second surface where the emitted electromagnetic radiation may be viewed is greater than about 180 degrees relative to the line of reference.

18. A signaling assembly, comprising:
    a reflective substrate having opposite first and second surfaces;
    a plurality of electromagnetic radiation emitters borne by the second surface and which emit electromagnetic radiation, when energized; and
    a reflector having first and second portions, each of which has an axis of orientation, and wherein the first and second portions are each disposed in reflecting relation relative to a portion of the electromagnetic radiation emitters, and wherein the respective axes of orientation extend in different directions, one relative to the other, and wherein the first portion of the reflector directs emitted electromagnetic radiation in a direction so that it may pass through the reflective substrate and be viewed from locations forward of the first surface, and the second portion of the reflector directs emitted electromagnetic radiation in a direction so that it may be viewed from a location forward of the second surface.

19. A signaling assembly as claimed in claim 18, and wherein the plurality of electromagnetic radiation emitters are each mounted in approximately the same orientation relative to the second surface.

20. A signaling assembly as claimed in claim 18, and wherein the plurality of electromagnetic radiation emitters are mounted in different orientations relative to the second surface.

21. A signaling assembly as claimed in claim 18, and wherein the plurality of electromagnetic radiation emitters are each mounted in approximately the same orientation relative to the second surface, and wherein the first portion of the reflector is disposed in reflecting relation relative to at least one electromagnetic radiation emitter, and wherein the at least one electromagnetic radiation emitter is oriented in offset relation relative to the axis of orientation.

22. A signaling assembly as claimed in claim 18, and wherein the plurality of electromagnetic radiation emitters are each mounted in the same orientation relative to the second surface, and wherein the first portion of the reflector is disposed in eccentric reflecting relation relative to the axis of orientation of the at least one electromagnetic radiation emitter.

23. A signaling assembly as claimed in claim 18, and wherein the first and second portions of the reflector are disposed in spaced relation, on to the other.

24. A signaling assembly as claimed in claim 18, and wherein the first and second portions of the reflector are made integral, one with the other.

25. A signaling assembly as claimed in claim 18, and wherein the second portion of the reflector is disposed in reflecting relation relative to at least one of the electromagnetic radiation emitters, and wherein the at least one electromagnetic radiation emitter is oriented in substantially coaxial alignment relative to the axis of orientation.

26. A signaling assembly as claimed in claim 18, and wherein the second portion of the reflector is disposed in reflecting relation relative to at least one of the electromagnetic radiation emitters, and wherein the at least one electromagnetic radiation emitter is oriented in offset relation relative to the axis of orientation.

27. A signaling assembly as claimed in claim 18, and wherein the plurality of electromagnetic radiation emitters are mounted in an orientation relative to the second surface, and wherein the signaling assembly further comprises:
    a housing having a sidewall and which defines a cavity, and wherein the sidewall further defines first and second apertures, and wherein the reflective substrate substantially occludes the first aperture, and wherein the second surface of the reflective substrate faces in the direction of the cavity, and wherein the second portion of the reflector directs emitted electromagnetic radiation through the second aperture.

28. A signaling assembly as claimed in claim 27, and wherein the reflective substrate comprises:
    a light transmissible substrate having opposite forward and rearward facing surfaces; and
    a reflective layer positioned in covering relation relative to one of the first, or second surfaces, and wherein the plurality of electromagnetic radiation emitters are borne on the rearward facing surface.

29. A signaling assembly as claimed in claim 28, and wherein the reflective layer comprises chromium which is deposited to a thickness which permits the passage of electromagnetic radiation therethrough.

30. A signaling assembly as claimed in claim 28, and wherein the reflective layer comprises chromium which is deposited to a thickness which passes less than about 6% of ambient visible electromagnetic radiation, and wherein a discrete aperture is formed in the reflective chromium layer and which passes the electromagnetic radiation emitted by at least one of the electromagnetic radiation emitters, and wherein the at least one electromagnetic radiation emitter is disposed in laterally outwardly disposed relation relative to the aperture.

31. A signaling assembly as claimed in claim 28, and wherein the reflective layer comprises a dichroic coating which passes a band electromagnetic radiation, and wherein at least one electromagnetic radiation emitter emits electromagnetic radiation which is reflected by the first portion of the reflector, and which is passed by the dichroic coating.

32. A signaling assembly, comprising:
    a housing mounted on an overland vehicle and which has a substantially opaque sidewall, and which defines an internal cavity, and first and second apertures, and wherein the housing has opposite first and second sides;

a reflective substrate having opposite first and second surfaces, and wherein the second surface of the reflective substrate faces in the direction of the cavity, and wherein the reflective substrate substantially occludes the first aperture, and the first surface faces away from cavity, and wherein the reflective substrate is operable to both reflect and pass visibly discernible electromagnetic radiation;

a translucent substrate disposed in substantially occluding relation relative to the second aperture;

a plurality of electromagnetic radiation emitters mounted on the second surface of the reflective substrate and which each face in the direction of the cavity, and which, when energized emit visibly discernible electromagnetic radiation; and a reflector positioned in reflecting relation relative to the plurality of electromagnetic radiation emitters, and wherein the reflector has a first portion which reflects electromagnetic radiation emitted by at least one the electromagnetic radiation emitters in a direction where it is subsequently passed by the reflective substrate and can be seen from one side of the housing, and a second portion which reflects the electromagnetic radiation emitted by at least one of the electromagnetic radiation emitters through the translucent substrate which substantially occludes the second aperture, and wherein the electromagnetic radiation which passes through the translucent substrate can be viewed from the opposite side of the housing.

33. A signaling assembly as claimed in claim 32, and wherein the first portion of the reflector forms a first signal, and the second portion of the reflector forms a second signal, and wherein the first and second signals are produced substantially simultaneously.

34. A signaling assembly as claimed in claim 33, and wherein the first signal can be viewed from locations which are rearwardly disposed relative to overland vehicle, and wherein the second signal can be viewed from locations which are forwardly disposed relative to the overland vehicle.

35. A signaling assembly as claimed in claim 32, and wherein the first portion of the reflector forms a first signal, and the second portion of the reflector forms a second signal, and wherein the respective electromagnetic radiation emitters can be energized at different times to produce the first and second signals.

36. A signaling assembly as claimed in claim 32, and wherein the visibly discernible electromagnetic radiation forming the first and second signals are of substantially the same color.

37. A signaling assembly as claimed in claim 32, and wherein the visibly discernible electromagnetic radiation forming the first and second signals have different colors.

38. A signaling assembly for use on an overland vehicle, comprising:

a housing having a sidewall, and which defines first, second and third apertures, and first and second internal cavities;

a reflective substrate supported by the housing and disposed in substantially occluding relation relative to the first aperture, and wherein the reflective substrate defines a first line of reference;

an opaque circuit board supported by the housing and disposed in substantially occluding relation relative to the second aperture, and wherein the circuit board has a forwardly facing surface which defines a second line of reference, and a rearwardly facing surface which faces in the direction of the second internal cavity, and wherein the second line of reference is oriented in spaced relation relative to the first line of reference, and wherein the opaque circuit board defines a plurality of apertures, and wherein the third aperture which is defined by the housing communicates with the second internal cavity;

a translucent substrate disposed in substantially occluding relation relative to the third aperture which is defined by the housing;

a plurality of electromagnetic radiation emitters mounted on the rearwardly facing surface of the opaque circuit board, and which, when energized, emit electromagnetic radiation which passes through the apertures defined by the opaque circuit board and the translucent substrate; and a reflector mounted on the rearwardly facing surface of the opaque circuit board, and wherein the reflector has a first portion which is oriented in reflecting relation relative to some of the electromagnetic radiation emitters, and a second portion which is oriented in reflecting relation relative to the remainder of the electromagnetic radiation emitters.

39. A signaling assembly as claimed in claim 38, and wherein the first portion of the reflector reflects emitted electromagnetic radiation in a direction so that it may pass through the apertures formed in the opaque circuit board, and may be viewed from a position forward of the forwardly facing surface of the opaque circuit board, and wherein the second portion of the reflector reflects emitted electromagnetic radiation through the third aperture and the, translucent substrate so that it may be viewed from a position forward of the rearwardly facing surface of the opaque circuit board.

40. A signaling assembly as claimed in claim 38, and wherein an optical coating is applied to the translucent substrate and which impedes the passage of ambient electromagnetic radiation into the second cavity.

* * * * *